Aug. 7, 1962
L. P. WESTON
3,048,048
INFLATABLE RIM PULLEY
Filed July 10, 1959
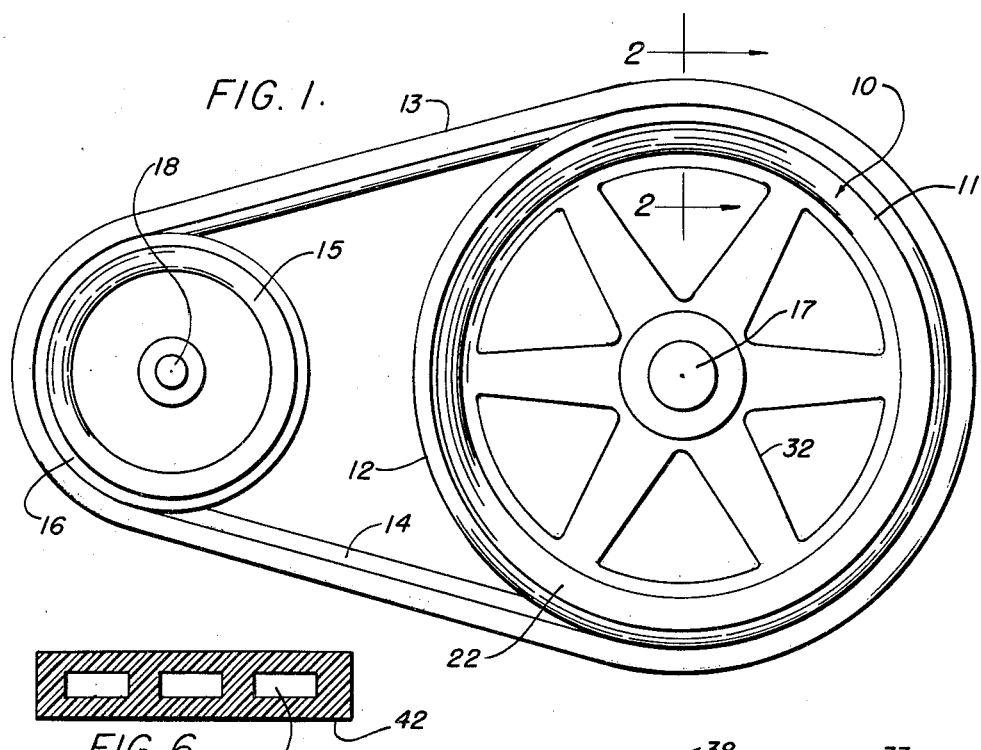
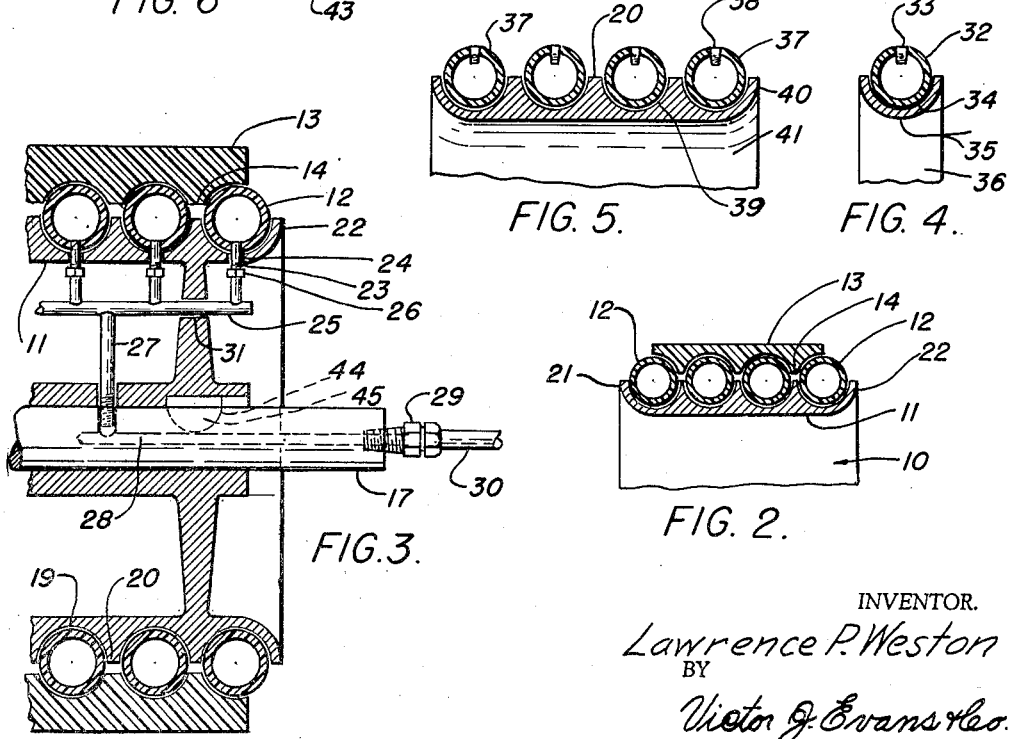
INVENTOR.
Lawrence P. Weston
BY
Victor J. Evans & Co.
ATTORNEYS.

United States Patent Office 3,048,048
Patented Aug. 7, 1962

3,048,048
INFLATABLE RIM PULLEY
Lawrence P. Weston, Gibbon, Nebr.
Filed July 10, 1959, Ser. No. 826,165
1 Claim. (Cl. 74—230.7)

This invention relates to power transmission and particularly driving belts and pulleys of the inflatable rim type, and in particular a pulley having a pneumatic tube, or a plurality of pneumatic tubes extended around and mounted on the rim and a belt super-imposed upon the pneumatic tube or tubes.

The purpose of this invention is to provide pneumatic means on the rim of a pulley whereby the diameter of the pulley is varied by the pressure of fluid in said pneumatic means.

Various types of adjustable pulleys have been used in transmission machinery and equipment and different types of adjustment for regulating the diameters of pulleys have been provided. However, it is difficult to change the speed ratio between pulleys operatively connected by belts without mechanically adjusting sections of a pulley. With this thought in mind this invention contemplates a pulley having pneumatic elements on the rim with the elements inflated while the pulley is stationary or wherein the elements may be inflated through the shaft and pulley while the pulley and a belt trained thereon are in operation.

The object of this invention is, therefore, to provide a driving or transmission assembly wherein an inflated tube, or a plurality of inflated tubes are positioned on faces of the pulleys and between the rims of the pulleys and belts trained thereon whereby the effective diameters of the pulleys are varied by pressures of fluid in the tubes.

Another object of this invention is to provide a driving or transmission belt having a continuous cavity or cavities extended longitudinally therethrough wherein air under pressure is retained in the cavity or cavities.

Another important object of the invention is to provide an inflated transmission belt in which variations of pressure in the belt change the pitch diameter of the portion of a belt extended around a pulley.

A further important object of the invention is to provide an inflated transmission unit having fluid containing tubes positioned to extend around a rim of a wheel, and a super-imposed belt carried by the tubes and mounted so that the combination provides speed varying means, such as that required for a connection between an engine and a drive shaft of a motor vehicle.

A still further object of the invention is to provide an inflatable transmission unit which is of a relatively simple and economical construction.

With these and other objects and advantages in view the invention embodies a pulley having inflated tubes extended around the rim and an endless transmission belt including a tube or a plurality of tubes or endless belts having spaced continuous longitudinally disposed cavities therein, trained over the tubes on the pulley, and said pulley having grooved rims for receiving the tubes of the belt.

Other features and advantages of the invention will appear from the following description taken in connection with the drawing, wherein:

FIGURE 1 is a side-elevational view showing a belt mounted on inflated tubes on the rims of driving and driven pulleys.

FIGURE 2 is a cross-section through the rim of the large pulley taken on line 2—2 of FIGURE 1, showing a belt mounted on inflated tubes on the rim of the pulley.

FIGURE 3 is a longitudinal section through a pulley, such as the pulley shown in FIGURE 1 illustrating an air pressure connection whereby air under pressure is supplied to the tubes through the shaft and pulley, part of the pulley being broken away.

FIGURE 4 is a section through the rim of a pulley illustrating a modification wherein a single inflated tube is used for driving.

FIGURE 5 is a cross-section, similar to that shown in FIGURE 4 showing a plurality of inflated tubes on the rim of a pulley.

FIGURE 6 is a cross-section showing a further modification wherein a belt is provided with continuous longitudinally disposed cavities or channels whereby the belt may be inflated.

Referring now to the drawing wherein like reference characters denote corresponding parts the improved transmission unit of this invention includes a pulley 10 having a rim 11 with endless inflated tubes 12 extended around the rim, and a belt 13 positioned to travel on the tubes.

The belt 13 is provided with continuous spaced tongues or ridges 14 on the inner surface, and the tongues are positioned to extend between the tubes, as shown in FIGURES 2 and 3.

The belt 13 is trained over a similar pulley 15 having inflated tubes 16 on the rim. The pulley 10 may be mounted upon a shaft 17, such as a drive shaft, and the pulley 15 may be mounted on a shaft 18, which may be a shaft of a motor or crank shaft of an engine.

The tubes 12 are positioned in annular grooves 19 of the rim 11 of the pulley 10 and, as illustrated in FIGURE 2, the grooves 19 receive annular ribs 20 between the tubes. The rim is also provided with side flanges 21 and 22 for maintaining the tubes in position on the rim.

As illustrated in FIGURE 3 the tubes are provided with nipples 23 that extend through openings 24 in the rim 11 and the nipples 23 are connected to a supply tube 25 by couplings 26. The supply tube 25 is connected by a tubular stem 27 to a passage 28 in the shaft 17 and the extended end of the shaft is provided with a coupling 29 by which a tube 30 for supplying air under pressure to the tubes 12 may be connected to the passage 28. The tube 25 may extend through an opening 31 in one of the spokes 32 of the wheel 10.

With the parts assembled in this manner the pressure of fluid in the tubes 12 may be varied and by changing the pressure the ratio between the driving and driven pulleys may be changed. With the tubes 12 of sufficient size and by the use of sufficient pressure the combination may be used for a transmission between an engine and a drive shaft of a motor vehicle.

In the design illustrated in FIGURE 4 a single tube 32 having an inflating valve 33 therein is mounted in a groove 34 of a rim 35 of a wheel 36 whereby a tubular belt is provided and when the wheel 36 is not in operation the pressure in the belt may be increased or decreased as desired.

In the design illustrated in FIGURE 5 tubes 37 having inflating valves 38 are positioned in grooves 39 of a rim 40 of a wheel 41 and it will be understood that the transmission may be provided with a single tube or any suitable number of tubes may be used.

In the design illustrated in FIGURE 6 a belt 42 having longitudinally disposed cavities 43 therein as illustrated and it will be understood that the cavities may contain air at atmospheric pressure or pressure of air in the cavities may be increased or decreased as may be desired.

The combination of pulleys and belts, particularly with the tubes and belts inflated, provide transmission means for power machinery, pulleys for conveyors, elevators and also for other elements and devices.

Where air under pressure is supplied to tubes on a pulley it will be understood that the pulley may be stopped and air inserted through the valves 33 or 38, or with the pressure of the air adjusted as the pulley is in operation the compressed air may be supplied through the shaft, as shown in FIGURE 3, in which case the pulley is keyed through the shaft, such as by a key 44 extended into a slot 45, as shown in FIGURE 3.

The belts may be formed of round or square tubes or the tubes may be of any suitable shape in cross-section and the tubes may be of any suitable size.

It will be understood that modifications, within the scope of the appended claims, may be made in the design and arrangement of the parts without departing from the spirit of the invention.

What is claimed is:

The combination of a pulley having annular spaced grooves in the periphery thereof and a plurality of juxtapositioned endless inflatable elements with an inflatable element in each groove of the pulley, said inflatable elements having continuous longitudinally disposed cavities therein, means in said inflatable elements for admitting a fluid into said inflatable elements for the inflation thereof, said pulley having openings in the grooves to receive said means, an air supply tube mounted in the pulley, nipples mounted on said air supply tube for connection to the said means, a hollow shaft for mounting said pulley, means for connecting said air supply tube to said hollow shaft, and a coupling for connecting a tube connected to a source of fluid supply connected to said coupling so that said inflatable elements may be inflated during the rotation of said pulley to vary the speed ratio of said pulley.

References Cited in the file of this patent

UNITED STATES PATENTS

| | | |
|---|---|---|
| 2,107,405 | Williams | Feb. 8, 1938 |
| 2,119,395 | Locke | May 31, 1938 |
| 2,156,841 | Davis | May 2, 1939 |
| 2,173,340 | Myers | Sept. 19, 1939 |
| 2,355,666 | MacGregor | Aug. 15, 1944 |
| 2,566,768 | Jones | Sept. 4, 1951 |
| 2,882,738 | Camenzind | Apr. 21, 1959 |
| 2,886,378 | Anderson | May 12, 1959 |
| 2,898,965 | Eddy | Aug. 11, 1959 |

FOREIGN PATENTS

| | | |
|---|---|---|
| 19,351 | Great Britain | of 1893 |
| 904,045 | France | Feb. 12, 1945 |